United States Patent
Fujimoto

(10) Patent No.: US 10,788,363 B2
(45) Date of Patent: Sep. 29, 2020

(54) SINGLE PHOTON AVALANCHE DIODE CONTROL CIRCUIT

(71) Applicant: SHARP KABUSHIKI KAISHA, Sakai, Osaka (JP)

(72) Inventor: Yoshihisa Fujimoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 77 days.

(21) Appl. No.: 16/249,294

(22) Filed: Jan. 16, 2019

(65) Prior Publication Data

US 2019/0219443 A1    Jul. 18, 2019

(30) Foreign Application Priority Data

Jan. 17, 2018    (JP) .................................. 2018-005809

(51) Int. Cl.
    *G01J 1/44*    (2006.01)

(52) U.S. Cl.
    CPC ........... *G01J 1/44* (2013.01); *G01J 2001/442* (2013.01); *G01J 2001/4466* (2013.01)

(58) Field of Classification Search
    CPC ................... G01J 1/44; G01J 2001/442; G01J 2001/4466; H01L 31/107
    USPC ........................................ 250/214 R, 214 VT
    See application file for complete search history.

(56) References Cited

U.S. PATENT DOCUMENTS

| 2014/0191115 A1* | 7/2014 | Webster ............ H01L 27/14609 250/214 R |
| 2015/0123013 A1 | 5/2015 | Schneider et al. |
| 2015/0285625 A1 | 10/2015 | Deane |
| 2016/0223397 A1* | 8/2016 | Tsai .......................... G01J 1/44 |

FOREIGN PATENT DOCUMENTS

| CN | 103148950 A | 6/2013 |
| CN | 107449516 A | 12/2017 |
| JP | 2015-117970 A | 6/2015 |

(Continued)

OTHER PUBLICATIONS

Hironari Takehara et al., "Development of a CMOS Image Sensor with Stacked Photodiodes for Lensless Digital ELISA System", The Institute of Image Information and Television Engineers Annual Convention, 15-7, Aug. 30, 2013.

(Continued)

*Primary Examiner* — Kevin K Pyo
(74) *Attorney, Agent, or Firm* — ScienBiziP, P.C.

(57) ABSTRACT

A SPAD control circuit for detecting a photon is provided. The SPAD control circuit includes a single photon avalanche diode (SPAD), a switch, a combinational circuit, and a sequential circuit. The SPAD has two terminals. The switch applies a voltage to one of the two terminals of the SPAD. The combinational circuit detects whether the SPAD is in an active state or a standby state. The sequential circuit includes a terminal that receives input of a pulse signal used to set the SPAD to the active state, a terminal that receives input of a reset-related signal, and an output terminal. The switch is controlled by an output signal output from the output terminal of the sequential circuit. An output signal of the combinational circuit is input to the terminal of the sequential circuit that receives input of the reset-related signal.

4 Claims, 7 Drawing Sheets

(56) References Cited

FOREIGN PATENT DOCUMENTS

| JP | 2015-520366 A | 7/2015 |
|----|---------------|--------|
| JP | 2017-520134 A | 7/2017 |

OTHER PUBLICATIONS

David Eric Schwartz et al., "A Single-Photon Avalanche Diode Array for Fluorescence Lifetime Imaging Microscopy", IEEE Journal of Solid-State Circuits, 2008, 43(11): 2546-2557.

* cited by examiner

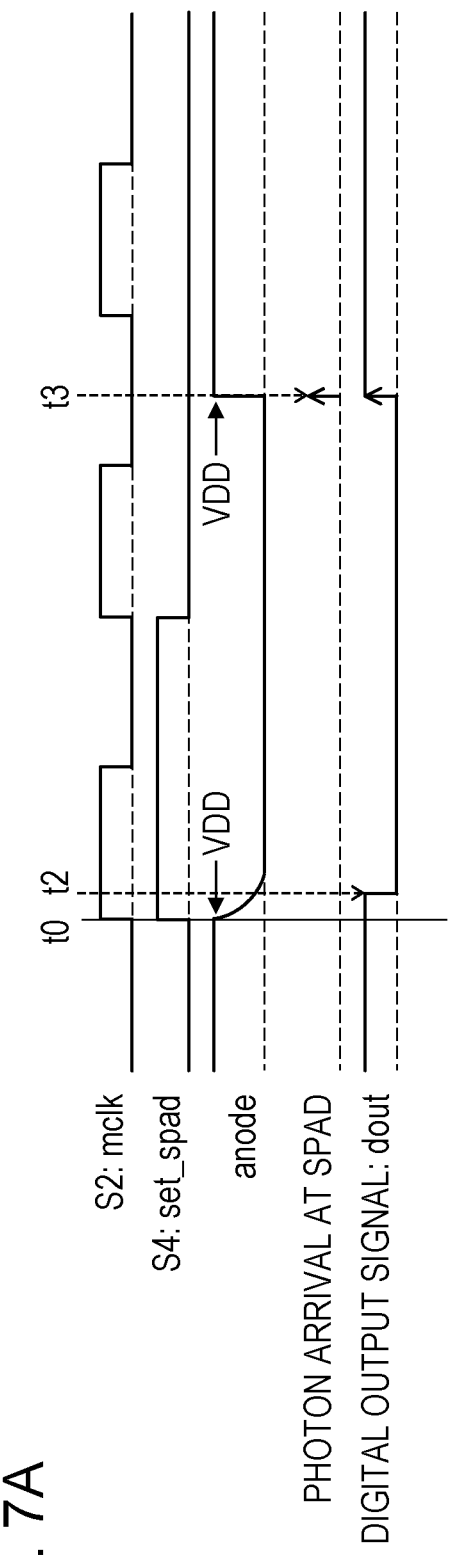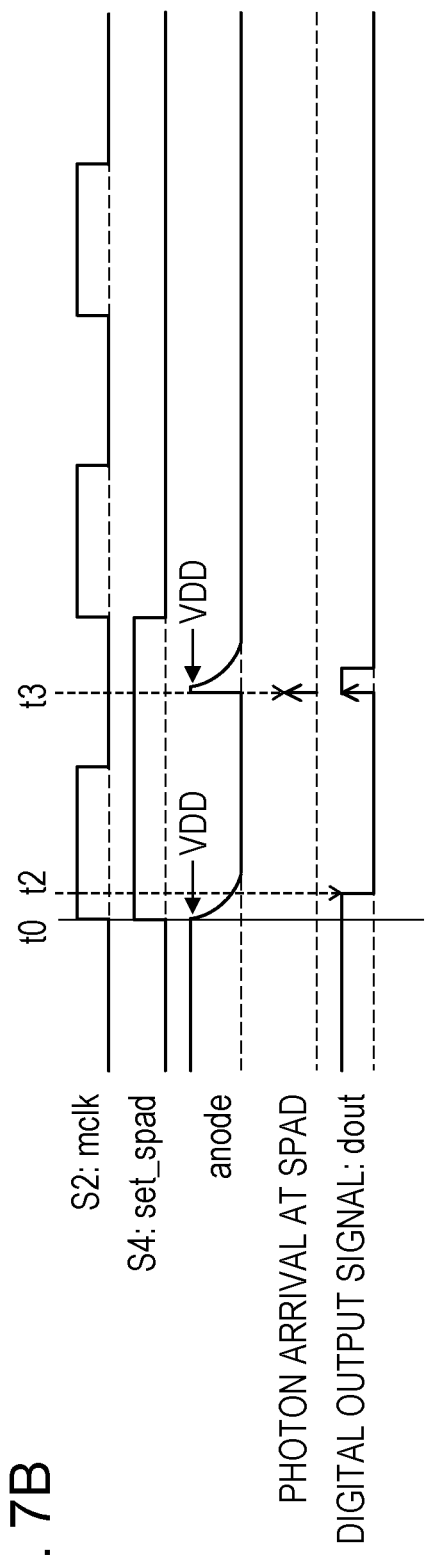

SINGLE PHOTON AVALANCHE DIODE CONTROL CIRCUIT

BACKGROUND

1. Field

The present disclosure relates to a single photon avalanche diode control circuit.

2. Description of the Related Art

There are various CMOS sensors used to sense light. Among these, single photon avalanche diodes (to be also referred to as "SPADs" hereinafter), which have the capability to sense light at the single-photon level, enable measurements such as counting of photons in low-intensity light and measuring of single-photon arrival times. Expected applications of SPADs include range imaging sensors that sense the distance travelled by light as an image, and bioimaging such as fluorescence intensity sensing and fluorescence lifetime sensing.

A typical photodiode is used with a reverse bias applied between the anode and the cathode. With a SPAD, a reverse bias is applied on the diode above its breakdown voltage to increase the input light-output current gain, thus enabling detection of light at the single-photon level. At this time, detection of a single photon triggers an avalanche breakdown in the SPAD. Use of a SPAD involves operations such as quenching avalanche breakdown and recharging the SPAD for the next photon detection. Such operations add complexity to the control of the SPAD. That said, since SPADs are suited for CMOS processes, it is possible to perform complicated control of SPADs by use of transistors or other devices.

An example of a SPAD control circuit is illustrated in FIG. 6A of David Eric Schwartz et. al., "A Single-Photon Avalanche Diode Array for Fluorescence Lifetime Imaging Microscopy", IEEE JSSC vol. 43, No. 11, November 2008. As illustrated in FIG. 6A, a SPAD control circuit according to related art typically employs several transistors and several logic circuits.

A lensless ELISA (Enzyme-Linked ImmunoSorbent Assay) exists as an example of a protein analyzer that uses light. An example of a technique related to such a lensless ELISA is illustrated in FIG. 1 of Hironari Takehara et. al., "Development of A CMOS Image Sensor with Stacked Photodiodes for Lensless Digital ELISA System", The Institute of Image Information and Television Engineers Annual Convention, 15-7, Aug. 30, 2013. According to this technique, analysis is performed by dropping a sample to be analyzed (e.g., fluorescent sample) onto an IC incorporating a photosensor, irradiating the sample with a laser beam, and sensing low-intensity light excited from the sample.

The technique as described by Hironari Takehara et. al. (ibid.) allows for reduced system cost and size. With this technique, however, the sample and the photosensor are irradiated with a laser beam. The laser beam, which is an intense beam of light, may cause the photosensor to saturate. For this reason, this technique may not be able to sense low-intensity light that is desired to be analyzed with the photosensor. One common way to address this is to provide an optical filter between the photosensor and the sample to ensure that the photosensor is not irradiated with such an intense laser beam.

Configuration of SPAD Control Circuit According to Related Art

FIGS. 6A and 6B each illustrate an example of a typical SPAD control circuit. FIG. 6A illustrates an exemplary configuration in which a negative bias voltage of about −20 V is applied to the anode of a SPAD 110, and photon detections are read out from the cathode of the SPAD 110. The SPAD control circuit in FIG. 6A includes a pch transistor 695 (which functions as a high resistance) that biases the cathode of the SPAD 110 to a voltage VDD, an inverter 635 for reading a change in cathode voltage due to avalanche breakdown, and outputting the change in voltage to an output terminal 660 as a digital signal dout, a transistor 670 (671, 672A, 672B) for biasing the cathode of the SPAD 110 to 0 V or to the voltage VDD in accordance with the state of the SPAD 110, and a NAND gate 645.

FIG. 6B illustrates an exemplary configuration in which a bias voltage of about +20 V is applied to the cathode of the SPAD 110, and photon detections are read out from the anode of the SPAD 110. The SPAD control circuit in FIG. 6B includes an nch transistor 690 (which functions as a high resistance) that biases the anode of the SPAD 110 to 0 V, a buffer 630 for reading a change in anode voltage due to avalanche breakdown, and outputting the change in voltage to the output terminal 660 as a digital signal dout, and the transistor 670 (671, 672A, 672B) for biasing the anode of the SPAD 110 to 0 V or to the voltage VDD in accordance with the state of the SPAD 110, an AND gate 640, and an inverter 680.

Operation of SPAD Control Circuit According to Related Art

Since FIGS. 6A and 6B are complimentary to each other, and identical in basic operation, operation will be described below with reference to FIG. 6B, and a description will not be given of operation according to FIG. 6A.

Operation will be described below with reference to FIGS. 6B and 7A. FIG. 7A is a timing chart illustrating operation of a circuit configured as illustrated in FIG. 6B.

Immediately after detection of a photon by the SPAD 110 or in the initial state, the SPAD 110 is in standby state, and not able to detect a photon. At this time, the digital output signal dout of the output terminal 660 is at logic level "1", and the transistor 672B is in ON state. In this case, when an input signal set_spad input to the AND gate 640 is "0" (before time t0), the transistor 672A is ON, and the transistor 671 is OFF. As a result, the voltage VDD is applied to the anode of the SPAD 110 through the transistors 672A and 672B, and the voltage difference between the cathode and anode of the SPAD 110 is set below the breakdown voltage in reverse bias condition (standby state).

In order for the state of the SPAD 110 to transition from standby to active to enable photon detection, as illustrated in FIG. 7A, the input signal set_spad is set to "1" for a predetermined period of time (which in this case is equal to one cycle of a basic clock mclk) (setting period). Then, the output of the AND gate 640 goes "1" immediately after the input signal set_spad becomes "1". Thus, the transistor 672A goes from ON to OFF, and the transistor 671 goes from OFF to ON. As a result, 0 V is applied to the anode of the SPAD 110 through the transistor 671 (recharge operation).

Subsequently, when the anode voltage of the SPAD 110 transitions to a voltage near 0 V (time t2), the change in the state of the SPAD 110 is sensed by the buffer 630, and the respective outputs of the AND gate 640 and inverter 680 change. As a result, the transistors 672A, 672B, and 671 respectively become ON, OFF, and OFF, and recharging of the SPAD 110 is completed. At this time, the voltage difference between the cathode and anode of the SPAD 110 is set above the breakdown voltage of the SPAD 110 in reverse bias condition (active state).

After the input signal set_spad is subsequently returned to "0", an avalanche breakdown occurs upon detection of a photon by the SPAD 110 at a given time t3. This causes the voltage of the anode terminal to change from 0 V to VDD. Simultaneously with this voltage change, the output signal dout also changes from "0" to "1". The time at which such a change occurs in the output signal dout is measured or counted to detect photon arrival time, light intensity, or other such information.

Immediately after an avalanche breakdown occurs in the SPAD 110, it is desirable to keep the SPAD 110 in the standby state for as long as possible from the viewpoint of reducing parasitic effects described later.

FIG. 7B illustrates operation when a photon arrives at the SPAD 110 in the setting period (period in which set_spad="1"). The input signal set_spad is set from "0" to "1", and immediately after a recharge operation is completed and the SPAD 110 becomes active (time t2), a photon is detected by the SPAD 110 at time t3 and an avalanche breakdown occurs. This causes the anode voltage to change from 0 V to VDD. At this time, the input signal set_spad="1". Hence, the above-mentioned recharge operation is performed, and the SPAD 110 is not held in the standby state but immediately becomes active.

However, for photodetection using a SPAD, it is desired to perform the following operation to reduce well-known parasitic effects associated with an SPAD such as an afterpulsing effect and a memory effect. That is, the SPAD is held in the standby state for a while after an avalanche breakdown occurs upon detection of a photon. For this reason, desirably, the SPAD 110 does not perform photon detection during the setting period (period when the set_spad="1"). To this end, it is desirable to employ measures such as not irradiating the SPAD 110 with light during the setting period (inclusion of a shutter function), shortening the setting period, or not using the output signal dout in such a case (inclusion of a function to detect the occurrence of an avalanche breakdown in the SPAD 110 in the setting period).

Techniques according to related art may not be able to efficiently detect low-intensity photons.

An aspect of the disclosure provides a SPAD control circuit capable of reducing parasitic effects to enable efficient detection of low-intensity photons.

SUMMARY

According to an aspect of the disclosure, there is provided a SPAD control circuit for detecting a photon, the SPAD control circuit including a single photon avalanche diode (SPAD), a switch, a combinational circuit, and a sequential circuit. The SPAD has two terminals. The switch applies a voltage to one of the two terminals of the SPAD. The combinational circuit detects whether the SPAD is in an active state or a standby state. The sequential circuit includes a terminal that receives input of a pulse signal used to set the SPAD to the active state, a terminal that receives input of a reset-related signal, and an output terminal. The switch is controlled by an output signal output from the output terminal of the sequential circuit. An output signal of the combinational circuit is input to the terminal of the sequential circuit that receives input of the reset-related signal.

BRIEF DESCRIPTION OF THE DRAWINGS

FIGS. 7A and 7B are timing charts according to related art.

DESCRIPTION OF THE EMBODIMENTS

Embodiment 1

An embodiment of the present disclosure will be described in detail below.

Figure 1:
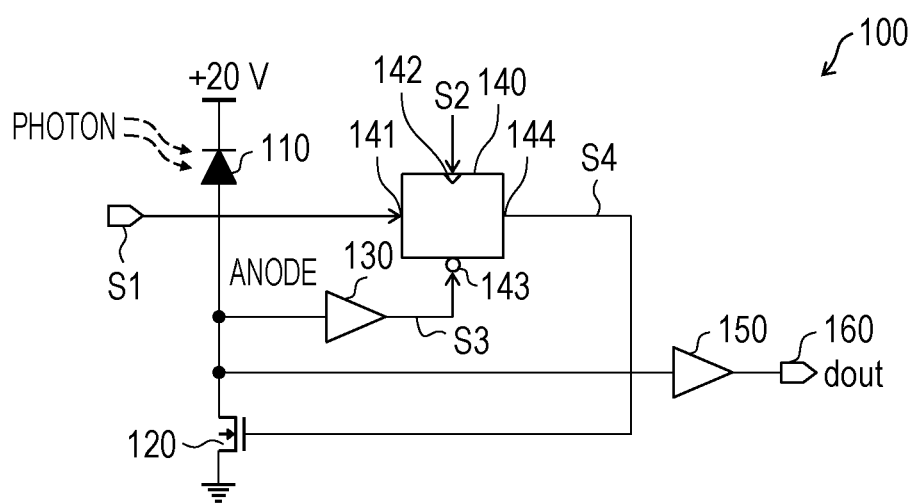
FIG. 1 is a circuit diagram illustrating a SPAD control circuit according to Embodiment 1 of the present disclosure.

FIG. 1 illustrates an exemplary circuit configuration of a SPAD control circuit 100 according to Embodiment 1. FIG. 1 illustrates an exemplary configuration of the SPAD control circuit 100 in which a bias voltage of about +20 V is applied to the cathode of a SPAD 110, and photon detections are read out from the anode of the SPAD 110.

Configuration of SPAD Control Circuit 100

As illustrated in FIG. 1, the SPAD control circuit 100 includes a combinational circuit (a buffer 150) for reading a change in anode voltage due to avalanche breakdown, and outputting the change in voltage to an output terminal 160 as a digital output signal dout, a combinational circuit (a buffer 130) for reading a change in anode voltage, and outputting the change in voltage to a sequential circuit described later, a switch (a transistor 120) for biasing the anode of the SPAD 110 to 0 V in accordance with the state of the SPAD 110, and the sequential circuit (a flip-flop 140).

In one embodiment, the sequential circuit (flip-flop 140) includes at least three flip-flop input terminals (a flip-flop data input terminal 141, a flip-flop clock input terminal 142, and a flip-flop asynchronous reset input terminal 143), and one flip-flop data output terminal 144. An external pulse signal S1 (set_pulse) is input to the flip-flop data input terminal 141. A basic clock signal S2 (mclk) is input to the flip-flop clock input terminal 142. An output signal S3 (resetb_asyn) from the buffer 130 is input to the flip-flop asynchronous reset input terminal 143. Accordingly, the output signal S3 from the buffer 130, which is input to the flip-flop asynchronous reset input terminal 143 will be also referred to as reset-related signal. The flip-flop data output terminal 144 outputs an output signal S4 (set_spad). The output signal S4 from the flip-flop output terminal is input to the gate of the transistor 120.

The sequential circuit (flip-flop 140) performs the following operation. When resetb_asyn is "1", set_pulse is sampled on the rising edge (sampling edge) of mclk, and output to set_spad. When resetb_asyn changes to "0", set_spad is set to "0" irrespective of the input state of set_pulse or mclk (asynchronous reset).

Operation of SPAD Control Circuit 100

Figure 2A:
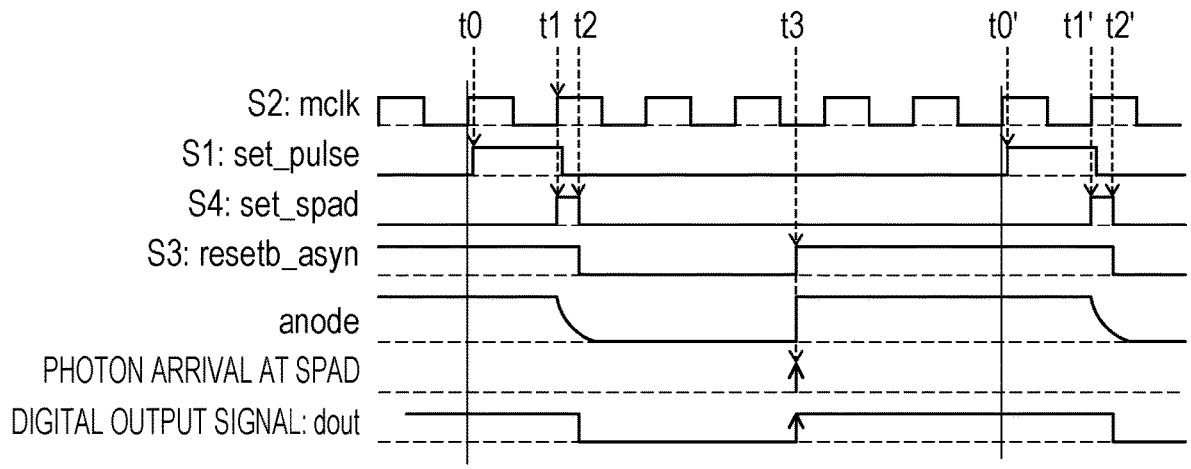
FIG. 2A is a timing chart according to Embodiment 1 of the present disclosure.

Operation of the SPAD control circuit 100 in FIG. 1 will be described next with reference to the timing chart of FIG. 2A. As illustrated in FIG. 2A, immediately after detection of a photon by the SPAD 110, the digital output signal dout output to the output terminal 160 goes from logic level "0"

to "1", the output (set_spad) of the sequential circuit (flip-flop 140) is maintained at "0", and the switch (transistor 120) is maintained in OFF state (before time t0). In this condition, the SPAD 110 is in standby state, and not able to detect a photon. Further, in this state, the anode voltage of the SPAD 110 changes to a voltage near the supply voltage VDD, and the voltage difference between the cathode and anode of the SPAD 110 is set below the breakdown voltage in reverse bias condition (standby state).

In order for the state of the SPAD 110 to transition from standby to active to enable photon detection, as illustrated in FIG. 2A, the input to the flip-flop data input terminal 141 is set to "1" for a predetermined period of time by the external pulse signal S1 (set_pulse) (setting preparation period). In one embodiment, the setting preparation period is set equal to one cycle of the basic clock signal S2 (mclk).

In one embodiment, the external pulse signal S1 (set_pulse) is an external signal that is input so as to include only one rising edge of the basic clock signal S2 (mclk), which is input to the flip-flop clock input terminal 142. At time t1 within the setting preparation period, the sequential circuit (flip-flop 140) samples, on the rising clock edge (sampling edge) of the basic clock signal S2 (mclk), the external pulse signal S1 (set_pulse) as an input signal, and outputs the output signal S4. As a result, the output signal S4 (set_spad) output from the flip-flop data output terminal 144 of the sequential circuit goes "1" (period in which set_spad is at "1"=setting period). Immediately after the output signal S4 (set_spad) of the sequential circuit goes "1", the switch (transistor 120) goes from OFF to ON, and 0 V is applied to the anode of the SPAD 110 through the switch (transistor 120). In other words, the switch becomes conducting immediately after the one included sampling edge, and 0 V is applied to the anode of the SPAD 110 through the switch (transistor 120). This operation is referred to as recharge operation. In another embodiment, in the sequential circuit (flip-flop 140), set_pulse may be sampled on the falling edge (sampling edge) of mclk and output to set_spad, and the external pulse signal S1 (set_pulse) may be input so as to include only one falling clock edge (sampling edge) of the basic clock signal S2 (mclk) input to the flip-flop clock input terminal 142.

Once recharging of the SPAD 110 is complete and the anode voltage goes near 0 V, the output signal S3 (resetb_asyn) from the combinational circuit (buffer 130) also goes "0". As a result, the sequential circuit (flip-flop 140) is asynchronously reset, and at time t2, the output signal S4 (set_spad) of the sequential circuit goes "0". At this time, the switch (transistor 120) connected to the anode of the SPAD 110 goes OFF, and becomes floating. As a result, the voltage difference between the cathode and anode of the SPAD 110 is held above the breakdown voltage in reverse bias condition. This state is referred to as active state.

Through the above-mentioned operation, the setting period can be minimized, thus extending the period of time in which the SPAD 110 is able to perform photon detection. The output signal S3 (resetb_asyn), which is dependent on the anode voltage of the SPAD 110, is input to the flip-flop asynchronous reset input terminal 143 of the sequential circuit (flip-flop 140). As a result, immediately after recharging of the SPAD 110 is complete, that is, immediately after the SPAD 110 becomes active, the sequential circuit (flip-flop 140) senses a change in the state of the SPAD 110 at time t2. Consequently, the output signal S4 (set_spad) of the sequential circuit is reset, and from t2 onward, the SPAD 110 is able to detect a photon.

It is assumed that a photon arrives at the SPAD 110 at a given time t3 after t2 and before the next t1'. As the incoming photon triggers an avalanche breakdown in the SPAD 110 at time t3, the anode voltage changes from 0 V to a voltage near VDD, and the digital output signal dout goes from "0" to "1". By detecting the time instant of this rising edge of the digital output signal dout or the frequency of occurrences of such rising edges, it is possible to detect, for example, photon arrival time, the intensity of light shone on the SPAD 110, or other such information. From time t3 onward, the SPAD 110 is held in the standby state until the next t2'. This makes it possible to reduce the parasitic effects mentioned above.

Embodiment 2

Another embodiment of the present disclosure will be described below. For the convenience of explanation, components that are identical in function to the components described above with reference to Embodiment 1 will be designated by the same reference signs, and a description of such components will not be repeated.

Configuration of SPAD Control Circuit 300

Figure 3:
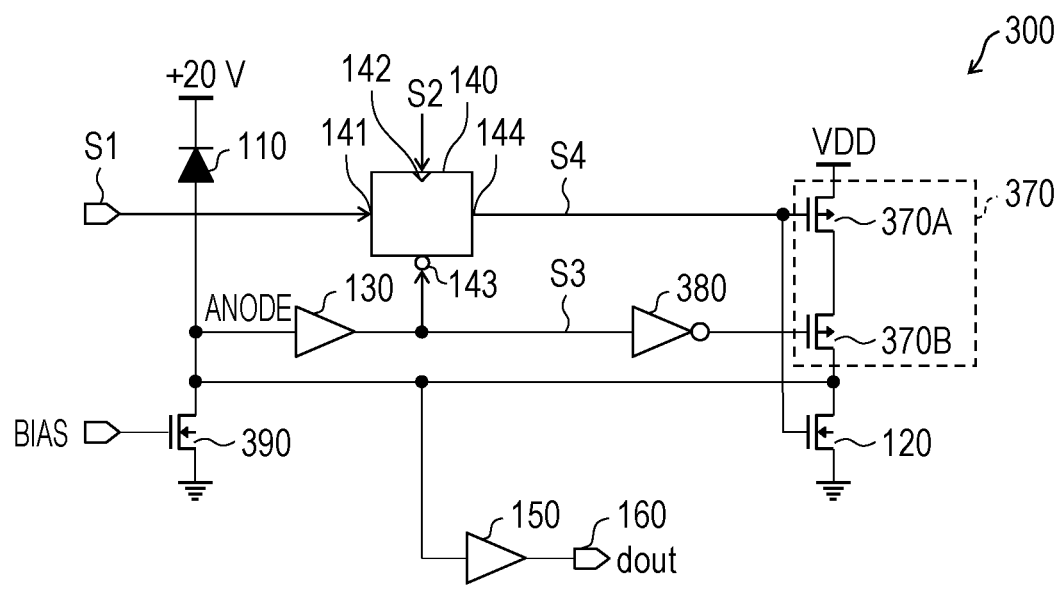
FIG. 3 is a circuit diagram illustrating a SPAD control circuit according to Embodiment 2 of the present disclosure.

FIG. 3 illustrates a SPAD control circuit 300. The SPAD control circuit 300 includes the following components further added to the SPAD control circuit 100 illustrated in FIG. 1: an nch transistor 390 (which functions as a high resistance) that biases the anode of the SPAD 110 to 0 V; a switch 370 (pch transistors 370A and 370B) for biasing the anode of the SPAD 110 to the voltage VDD in accordance with the state of the SPAD 110; and a combinational circuit (inverter 380).

The output signal S3 (resetb_asyn) from the buffer 130 is input to the inverter 380. An output signal from the inverter 380 is input to the gate of the pch transistor 370B. The output signal S4 (set_spad) from the flip-flop data output terminal 144 is input to the gate of the pch transistor 370A and to the gate of the transistor 120.

Operation of SPAD Control Circuit 300

Although the SPAD control circuit in FIG. 3 operates in basically the same manner as in FIG. 1, differences from FIG. 1 will be described below. The switch 370 (pch transistors 370A and 370B) is a component for holding the SPAD 110 in the standby state in accordance with the output signal S4 (set_spad) of the sequential circuit and the state of the SPAD 110. The switch 370 biases the anode of the SPAD 110 to the voltage VDD to hold the SPAD 110 in the standby state, only when the output signal S4 (set_spad) of the sequential circuit is "0" and the anode voltage of the SPAD 110 goes near VDD. That is, when the output signal S4 of the sequential circuit is "0", and the output signal S3 (resetb_asyn) is "1", both the pch transistors 370A and 370B constituting the switch 370 become conducting, and thus the switch 370 biases the anode voltage of the SPAD 110 to the voltage VDD. In other words, the switch 370 (pch transistors 370A and 370B) is controlled by the output signal S3 from the combinational circuit (buffer 130) and by the output signal S4 from the sequential circuit. As a result, the SPAD 110 is held in the standby state. For instance, a case is considered in which the switch 370 (pch transistors 370A and 370B) is removed from the SPAD control circuit illustrated in FIG. 3. In this case, upon transition of the SPAD 110 to the standby state due to avalanche breakdown, the switch (transistor 120) stays in OFF state, and hence the anode terminal goes into a high impedance state. This can cause the anode voltage to drop toward 0 V due to the presence of a parasitic current leak in the anode of the SPAD 110 or due to the nch transistor 390. The switch 370 (pch transistors 370A and 370B) is a component used to stably hold the SPAD 110 at the voltage VDD to thereby keep a stable standby state. That is, the combinational circuit (buffer 130) detects avalanche breakdown of the SPAD 110, and causes the switch 370 (pch transistors 370A and 370B) to be brought into conduction. This makes it possible to hold the SPAD 110 in a stable standby state immediately after the avalanche breakdown.

The nch transistor 390 is provided to hold the anode voltage at 0 V to thereby keep the SPAD 110 in a photon-detection enabled state, even if a parasitic leak is present in the anode of the SPAD 110 that becomes active upon being recharged. That is, the nch transistor 390 is a component for keeping a stable active state. A resistor of about several hundreds of kΩ to about 1 MΩ may be used instead of the nch transistor 390.

Embodiment 3

A still another embodiment of the present disclosure will be described below. For the convenience of explanation, components that are identical in function to the components described above with reference to Embodiments 1 and 2 will be designated by the same reference signs, and a description of such components will not be repeated.

Configuration of SPAD Control Circuit 400

Figure 4:
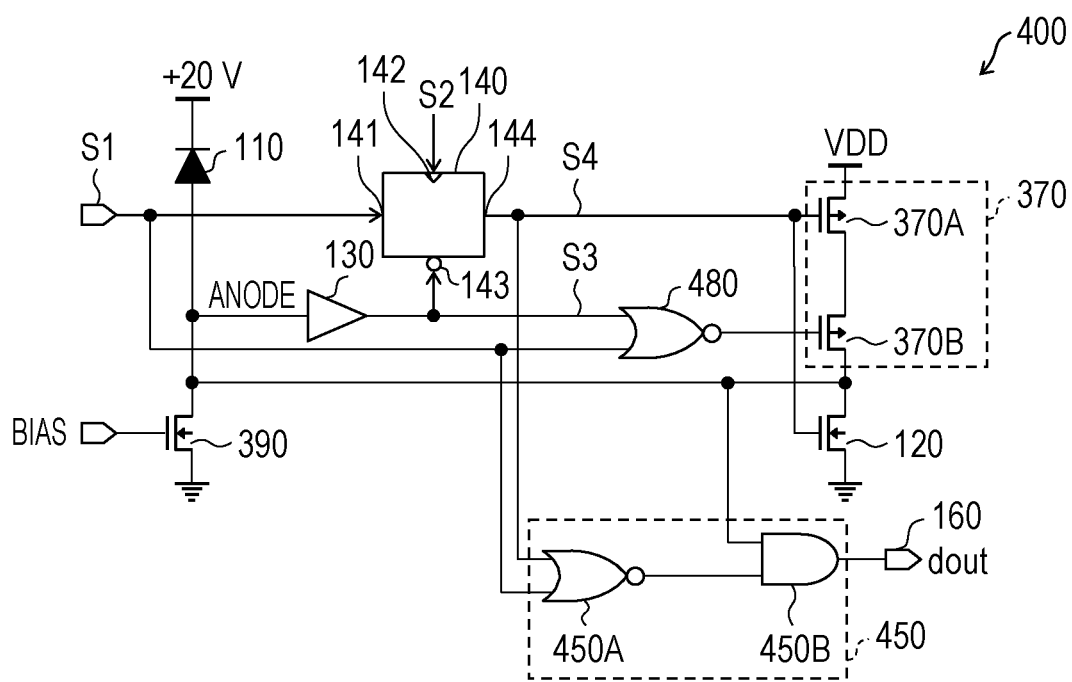
FIG. 4 is a circuit diagram illustrating a SPAD control circuit according to Embodiment 3 of the present disclosure.

FIG. 4 illustrates a configuration of a SPAD control circuit 400 according to Embodiment 3. In the configuration illustrated in FIG. 4, the inverter 380, which is one embodiment of a combinational circuit in the SPAD control circuit illustrated in FIG. 3, is replaced with a NOR gate 480, and the buffer 150, which is one embodiment of a combinational circuit connected to the digital output signal dout, is replaced with a combinational circuit 450 including a NOR gate 450A and an AND gate 450B.

The output signal S3 (resetb_asyn) from the buffer 130 is input to a first input terminal of the NOR gate 480. The external pulse signal S1 (set_pulse) is input to a second input terminal of the NOR gate 480. The output of the NOR gate 480 is input to the gate of the pch transistor 370B.

The output signal S4 (set_spad) from the flip-flop data output terminal 144 is input to a first input terminal of the NOR gate 450A. The external pulse signal S1 (set_pulse) is input to a second input terminal of the NOR gate 450A. A signal from the anode of the SPAD 110 is input to a first input terminal of the AND gate 450B. An output signal from the NOR gate 450A is input to a second input terminal of the AND gate 450B. The output of the AND gate 450B is input to the output terminal 160.

In the SPAD control circuit 400 according to Embodiment 3, the gate of the pch transistor 370B is controlled via the NOR gate 480 in a manner dependent on the state of the SPAD 110 and the external pulse signal S1 (set_pulse). The digital output signal dout is dependent on, in addition to the state of the SPAD 110, the external pulse signal S1 (set_pulse) and the output signal S4 (set_spad) of the sequential circuit.

Operation of SPAD Control Circuit 400

The operation of the SPAD control circuit 400 when a photon arrives at the SPAD 110 and an avalanche breakdown occurs in the SPAD 110 is basically the same as that of the SPAD control circuit 100 illustrated in FIG. 1 or the SPAD control circuit 300 illustrated in FIG. 3.

During the period when the external pulse signal S1 (set_pulse)="1" (setting preparation period), not only the pch transistor 370A but also the pch transistor 370B become conducting. This forces the anode to be biased at the voltage VDD, and the SPAD 110 is held in the standby state. In this way, a period during which the SPAD 110 is disabled to detect a photon is provided periodically for the SPAD control circuit 400.

Figure 2B:
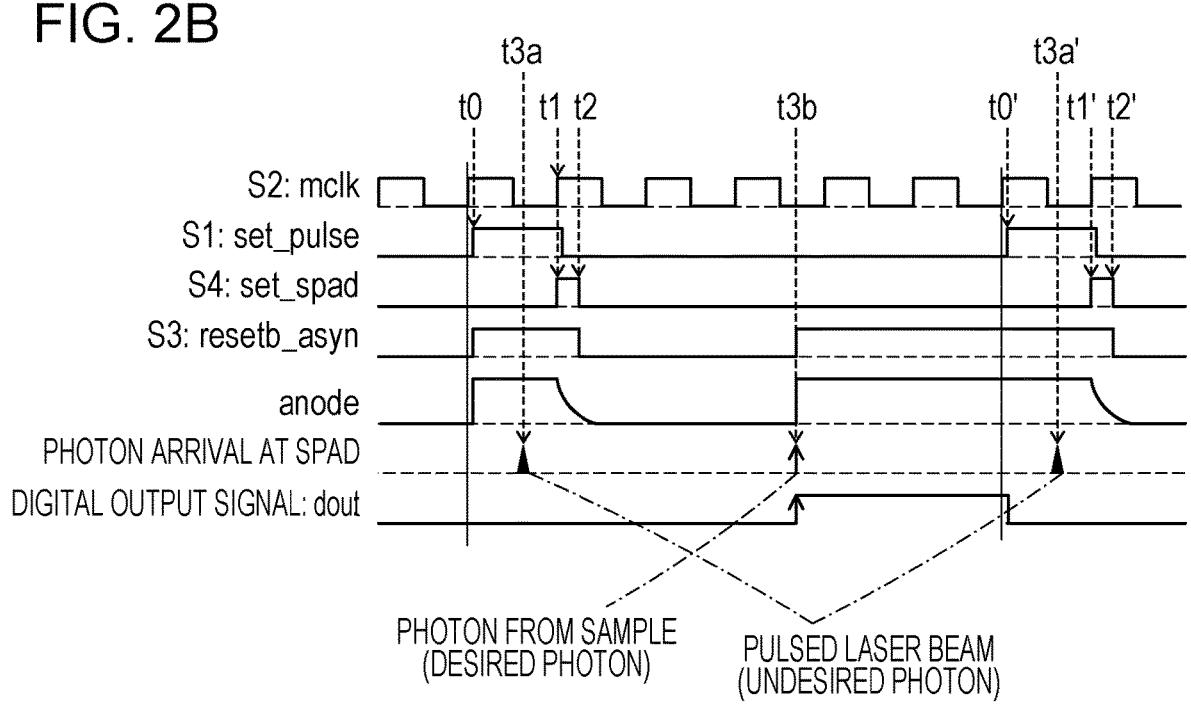
FIG. 2B is a timing chart according to Embodiment 3 of the present disclosure.

Operation of the SPAD control circuit 400 in FIG. 4 will be described below with reference to the timing chart of FIG. 2B. At time t0, the external pulse signal S1 (set_pulse) is set to "1" (setting preparation period), and the gate voltage of the pch transistor 370B becomes 0 through the NOR gate 480. The pch transistor 370B thus becomes conducting. Since the output signal S4 (set_spad) of the sequential circuit is maintained at "0", the pch transistor 370A is also in conducting state. Thus, the anode of the SPAD 110 is biased to the voltage VDD. Consequently, the SPAD 110 is held in the standby state. Further, the digital output signal dout is set at "0" through the combinational circuit 450 (NOR gate 450A and AND gate 450B) connected to the digital output signal dout. Even if the SPAD 110 is irradiated with a laser beam at time t3a in the setting preparation period, the SPAD 110 is held in the standby state and hence does not sense a photon. The digital output signal dout stays at "0". The operation after the end of the setting preparation period is the same as that of the SPAD control circuit 300 illustrated in FIG. 3, and thus a description of such operation will not be repeated.

From time t2 onward, the SPAD 110 is in active state. At time t3b, an avalanche breakdown occurs as a result of the SPAD 110 sensing a photon applied on the SPAD 110, and the pch transistor 370B becomes conducting and the anode voltage is held at the voltage VDD. At time t3b, the digital output signal dout changes to "1". By measuring or counting the time at which this change occurs, it is possible to detect photon arrival time, the intensity of light shone on the SPAD 110, or other such information. By contrast, the laser beam arriving at each of t3a and t3a' does not appear in the digital output signal dout.

Embodiment 4

Figure 5A:
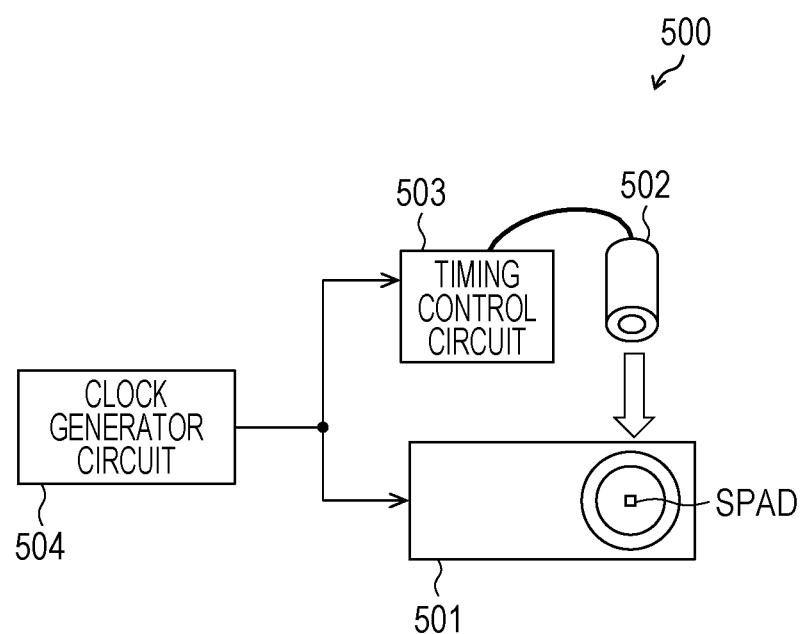
FIGS. 5A and 5B each schematically illustrate a detection system incorporating an SPAD control circuit according to an embodiment of the present disclosure.
Figure 5B:
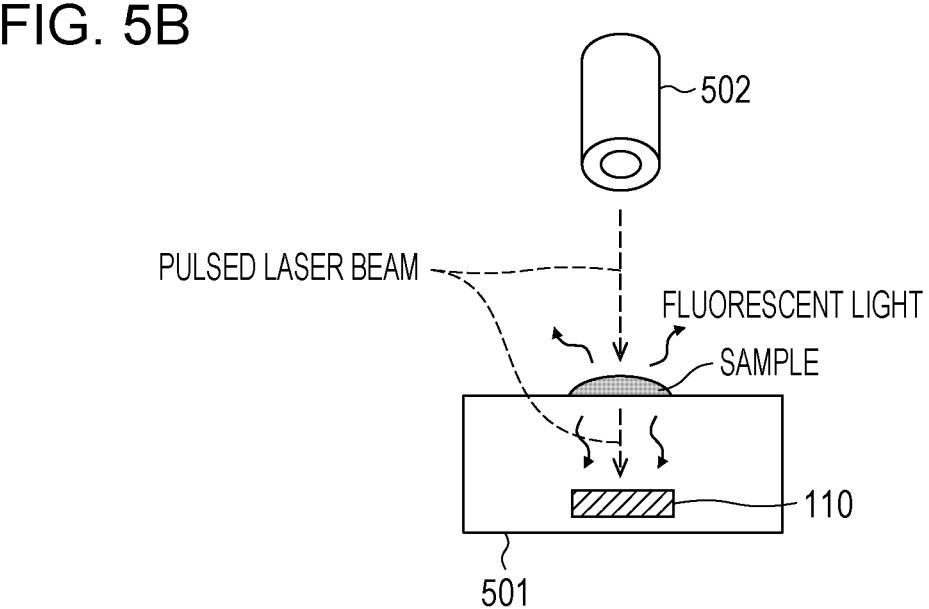
Figure 6A:
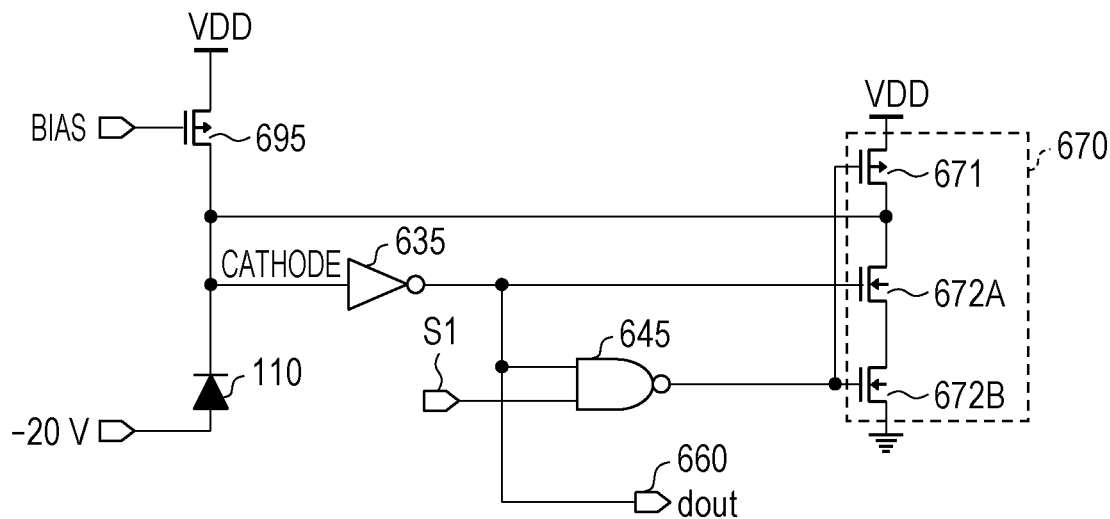
FIGS. 6A and 6B are circuit diagrams each illustrating a SPAD control circuit according to related art.
Figure 6B:
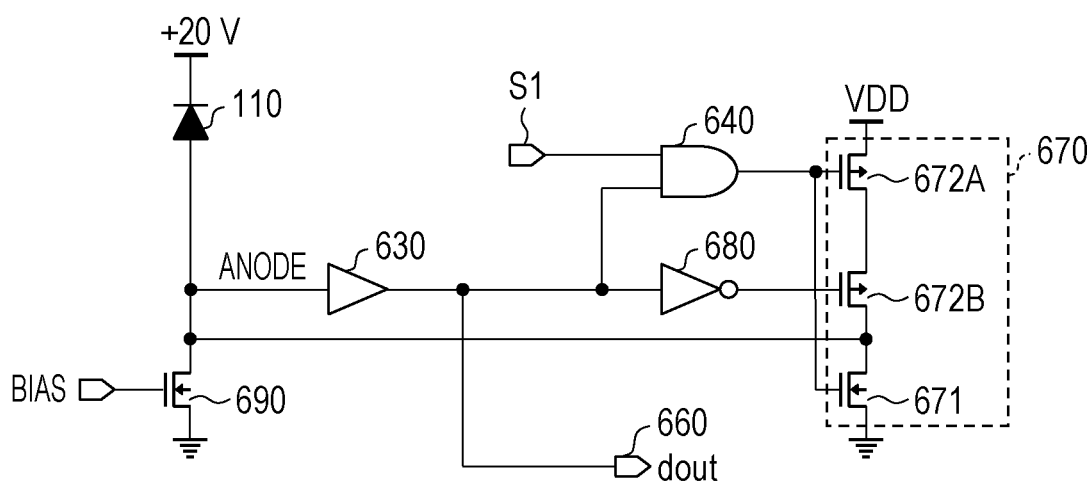

FIGS. 5A and 5B each schematically illustrate a detection system according to Embodiment 4.

Configuration of Detection System

FIG. 5A illustrates an exemplary application of the SPAD control circuit 400 illustrated in FIG. 4. A system 500 includes an IC incorporating the SPAD control circuit 400 (an IC 501 incorporating the SPAD control circuit 400), a light source that emits pulsed light (a pulsed laser 502), a timing control circuit 503 for operating the pulsed laser 502 and the SPAD control circuit 400 in synchronization with each other, and a clock generator circuit 504.

FIG. 5B illustrates a schematic cross-section of the IC 501 incorporating the SPAD 110. A sample of interest is disposed above the SPAD 110, and the sample is irradiated with a pulsed laser beam.

Operation of Detection System

By irradiating the sample with a pulsed laser beam, low-intensity fluorescent light is emitted from the sample immediately after the end of laser irradiation. By sensing the low-intensity fluorescent light with the SPAD 110, optical analysis of the sample can be performed. However, with this configuration, a pulsed laser beam, which is an intense beam of light, is also applied toward the SPAD 110. Detection of such an intense pulsed laser beam by the SPAD 110 makes the SPAD 110 unable to sense low-intensity light emitted from the sample. By applying a pulsed laser beam in the setting preparation period illustrated in FIG. 2B, that is, in the period during which the SPAD 110 is held in the standby state, the SPAD control circuit 400 can be made to sense only low-intensity light emitted from the sample without sensing the pulsed laser beam. As illustrated in FIG. 5A, by using the clock generator circuit 504 and the timing control circuit 503, the pulsed laser 502 is made to operate in synchronization with the external pulse signal S1 (set_pulse), which is used to set the setting preparation period. Accordingly, the light source (pulsed laser 502) emits pulsed light in synchronization with the SPAD control circuit. As a result, the timing of pulsed laser beam emission is adjusted to be within the setting preparation period, thus enabling the operation as illustrated in FIG. 2B.

CONCLUSION

According to a first aspect of the present disclosure, there is provided a SPAD control circuit for detecting a photon, the SPAD control circuit including a single photon avalanche diode (SPAD), a switch (transistor 120), a combinational circuit (buffer 130), and a sequential circuit (flip-flop 140). The SPAD has two terminals. The switch (120) applies a voltage to one of the two terminals of the SPAD. The combinational circuit (buffer 130) detects whether the SPAD is in an active state or a standby state. The sequential circuit (flip-flop 140) includes a terminal (flip-flop data input terminal 141) that receives input of a pulse signal (external pulse signal S1) used to set the SPAD to the active state, a terminal (flip-flop asynchronous reset input terminal 143) that receives input of a reset-related signal, and an output terminal (flip-flop data output terminal 144). The switch (transistor 120) is controlled by an output signal (S4 (set_spad)) output from the output terminal (flip-flop data output terminal 144) of the sequential circuit (flip-flop 140). An output signal (S3 (resetb_asyn)) of the combinational circuit (buffer 130) is input to the terminal (flip-flop asynchronous reset input terminal 143) of the sequential circuit (flip-flop 140) that receives input of the reset-related signal.

The above-mentioned configuration may make it possible to shorten the setting period for the SPAD without deteriorating parasitic effects associated with the SPAD, such as an afterpulsing effect or a memory effect. This may help extend the period of time during which the SPAD performs photon detection, thus improving the efficiency of photon detection by the SPAD along the time axis.

According to a second aspect of the present disclosure, the SPAD control circuit according to the first aspect may be configured such that the SPAD control circuit further includes a terminal (flip-flop clock input terminal 142) that receives input of a basic clock signal (S2 (mclk)), the pulse signal (external pulse signal S1) used to set the SPAD to the active state is input so as to include only one sampling edge of the basic clock signal (S2 (mclk)), and the switch is brought into conduction immediately after the one included sampling edge.

According to the above-mentioned configuration, the SPAD may be set to the active state in synchronization with the sampling edge of the basic clock signal. This may make it easier to build a system synchronized with another system.

According to a third aspect of the present disclosure, the SPAD control circuit according to the first or second aspect may be configured such that the SPAD control circuit further includes a switch (switch 370 (pch transistors 370A and 370B)) that applies a voltage to the one terminal of the SPAD, and the combinational circuit detects avalanche breakdown of the SPAD and causes the switch to be brought into conduction to stably hold the SPAD in the standby state immediately after the avalanche breakdown.

According to the above-mentioned configuration, the SPAD 110 may be stably held in the standby state or active state.

According to a fourth aspect of the present disclosure, there is provided a detection system including the SPAD control circuit according to any one of the first to third aspects, and a light source (pulsed laser 402) that operates in synchronization with the SPAD control circuit and emits pulsed light. The SPAD control circuit periodically holds the SPAD in the standby state in dependence on the pulse signal used to set the SPAD to the active state. The light source emits pulse light during a period in which the SPAD is in the standby state.

According to the above-mentioned configuration, the SPAD may be able to detect low-intensity fluorescent light emitted after pulsed light is emitted from the light source, without detecting the emitted pulsed light.

The present disclosure is not limited to the embodiments mentioned above but various modifications or alterations are possible within the scope of the appended claims. Embodiments obtained by suitably combining technical measures disclosed in different embodiments also fall within the technical scope of the present disclosure. Further, technical measures disclosed in individual embodiments may be combined to provide new technical features.

The present disclosure contains subject matter related to that disclosed in Japanese Priority Patent Application JP 2018-005809 filed in the Japan Patent Office on Jan. 17, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A SPAD control circuit for detecting a photon, the SPAD control circuit comprising:
    a single photon avalanche diode (SPAD) having two terminals;
    a switch that applies a voltage to one of the two terminals of the SPAD;
    a combinational circuit that detects whether the SPAD is in an active state or a standby state; and
    a sequential circuit having
        a first input terminal that receives input of a pulse signal used to set the SPAD to the active state,
        a second input terminal that receives input of a reset-related signal, and
        an output terminal,
    wherein the switch is controlled by an output signal output from the output terminal of the sequential circuit, and
    wherein an output signal of the combinational circuit is input to the second input terminal of the sequential circuit.

2. The SPAD control circuit according to claim 1,
    wherein the sequential circuit further has a third input terminal that receives input of a basic clock signal,
    wherein the pulse signal is input so as to include only one sampling edge of the basic clock signal, and
    wherein the switch is brought into conduction immediately after the one included sampling edge.

3. The SPAD control circuit according to claim 1, further comprising a switch that applies a voltage to the one terminal of the SPAD, wherein the combinational circuit detects avalanche breakdown of the SPAD and causes the switch to be brought into conduction to stably hold the SPAD in the standby state immediately after the avalanche breakdown.

4. A detection system comprising:

the SPAD control circuit according to claim 1; and a light source that emits pulsed light in synchronization with the SPAD control circuit, wherein the SPAD control circuit periodically holds the SPAD in the standby state in dependence on the pulse signal, and wherein the light source emits pulsed light during a period in which the SPAD is in the standby state.

* * * * *